(12) United States Patent
Schubert et al.

(10) Patent No.: US 10,475,241 B2
(45) Date of Patent: Nov. 12, 2019

(54) SUPER-RESOLUTION DISPLAYS AND METHODS OF OPERATING THE SAME

(71) Applicant: GOOGLE INC., Mountain View, CA (US)

(72) Inventors: Martin Friedrich Schubert, Sunnyvale, CA (US); Mark Bradley Spitzer, Sharon, MA (US)

(73) Assignee: GOOGLE LLC, Mountain View, CA (US)

( * ) Notice: Subject to any disclaimer, the term of this patent is extended or adjusted under 35 U.S.C. 154(b) by 159 days.

(21) Appl. No.: 15/014,622

(22) Filed: Feb. 3, 2016

(65) Prior Publication Data

US 2017/0221266 A1   Aug. 3, 2017

(51) Int. Cl.
| | | |
|---|---|---|
| G06T 19/00 | (2011.01) | |
| G06T 3/40 | (2006.01) | |
| G02B 27/01 | (2006.01) | |

(52) U.S. Cl.
CPC .......... *G06T 19/006* (2013.01); *G02B 27/017* (2013.01); *G06T 3/4053* (2013.01); *G06T 3/4076* (2013.01); *G02B 2027/0134* (2013.01)

(58) Field of Classification Search
None
See application file for complete search history.

(56) References Cited

U.S. PATENT DOCUMENTS

| | | | | |
|---|---|---|---|---|
| 5,777,588 A * | 7/1998 | Woodgate | .......... | G02B 27/2214 345/6 |
| 6,078,038 A | 6/2000 | Cooper | | |
| 7,097,311 B2 | 8/2006 | Jaynes et al. | | |
| 2006/0250696 A1* | 11/2006 | McGuire | ............ | G02B 27/0172 359/630 |
| 2007/0181686 A1* | 8/2007 | Mowry | ................ | G02B 3/0056 235/454 |
| 2010/0026173 A1* | 2/2010 | Lhee | ................... | H01L 27/3211 313/504 |
| 2012/0092590 A1* | 4/2012 | Shestak | ............ | G02F 1/133504 349/62 |
| 2012/0105582 A1 | 5/2012 | Youn et al. | | |
| 2012/0200534 A1* | 8/2012 | Salsman | ............... | G06F 3/0421 345/175 |
| 2012/0242985 A1* | 9/2012 | Watabiki | ............ | G01N 21/9501 356/237.5 |
| 2013/0207951 A1* | 8/2013 | Didyk | ....................... | G06T 3/40 345/207 |
| 2014/0178861 A1* | 6/2014 | Duer | ..................... | G02B 6/4226 435/5 |
| 2014/0267286 A1 | 9/2014 | Duparre | | |

(Continued)

OTHER PUBLICATIONS

International Search Report and Written Opinion Received for PCT Patent Application No. PCT/US2016/068048, dated Apr. 18, 2017, 9 Pages.

(Continued)

*Primary Examiner* — Jwalant Amin

(74) *Attorney, Agent, or Firm* — Brake Hughes Bellermann LLP

(57) ABSTRACT

Super-resolution displays, and methods of operating the same are disclosed herein. An example disclosed method includes emitting light from a pixel at a first location in a display assembly, and emitting light from the pixel at a second different location in the display assembly.

18 Claims, 10 Drawing Sheets

(56) References Cited

U.S. PATENT DOCUMENTS

| | | | |
|---|---|---|---|
| 2015/0150458 A1* | 6/2015 | Hielscher | A61B 5/0073 600/425 |
| 2015/0253487 A1* | 9/2015 | Nichol | G02B 6/0036 362/610 |
| 2015/0277121 A1* | 10/2015 | Fridental | G02B 27/0101 348/54 |
| 2015/0338670 A1* | 11/2015 | Hayashi | G02B 27/2214 349/57 |
| 2017/0205886 A1* | 7/2017 | Wan | G06F 3/011 |

OTHER PUBLICATIONS

"Wobulation", available online at <https://en.wikipedia.org/wiki/Wobulation>, retrieved on Oct. 21, 2015, 2 pages.

Ben-Ezra et al., "Jitter Camera: High Resolution Video from a Low Resolution Detector", Proceedings of the 2004 IEEE Computer Society Conference on Computer Vision and Pattern Recognition, vol. 2, Jun. 27-Jul. 2, 2004, pp. 135-142.

Damera-Vekata et al., "Realizing Super-Resolution with Superimposed Projection", IEEE Conference on Computer Vision and Pattern Recognition, Jun. 18, 2007, 8 pages.

Grossman et al., "SuperResolution Processing Technique Tackles Display With SuperHigh Pixel Counts", available online at <http://electronicdesign.com/displays/super-resolution-processing-technique-tackles-display-super-high-pixel-counts>, retrieved on Oct. 21, 2015, Jun 26, 2000, 5 pages.

Heide et al., "Cascaded Displays: Spatiotemporal Superresolution using Offset Pixel Layers", Journal of ACM Transactions on Graphics (TOG), Proceedings of ACM SIGGRAPH 2014, vol. 33, Issue 4, Jul. 2014, 11 pages.

Jaynes et al., "Super-Resolution Composition in Multi-Projector Displays", available online at <http://www.procams.org/procams2003/papers/jaynes_ramakrishnan.pdf>, 2003, 8 pages.

Kouri et al., "Efficient Multiframe Super-Resolution for Imagery with Lateral Shifts", Applied Optics, vol. 53, Issue 24, abstract available online at <https://www.osapublishing.org/ao/abstract.cfm?uri=ao-53-24-F1>, Aug. 20, 2014, pp. F1-F9.

Takaki et al., "Super Multi-View Display with a Lower Resolution Flat-Panel Display", Optics Express, vol. 19, Issue 5, 2011, pp. 4129-4139.

* cited by examiner

TIME T1    TIME T2    TIME T3    TIME T4

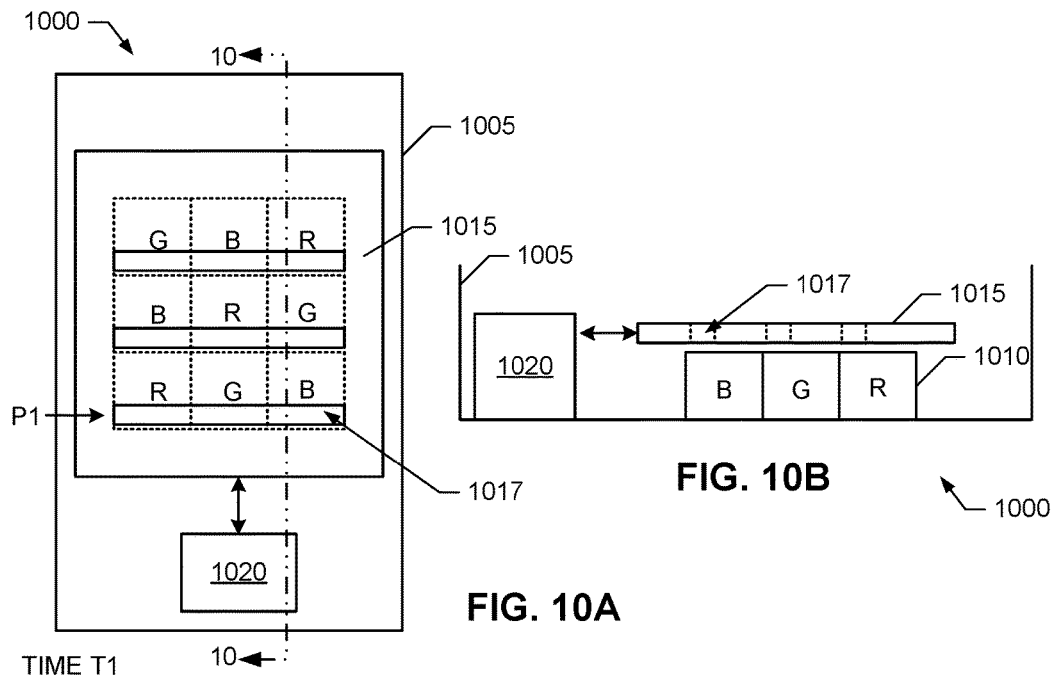
FIG. 10A
FIG. 10B
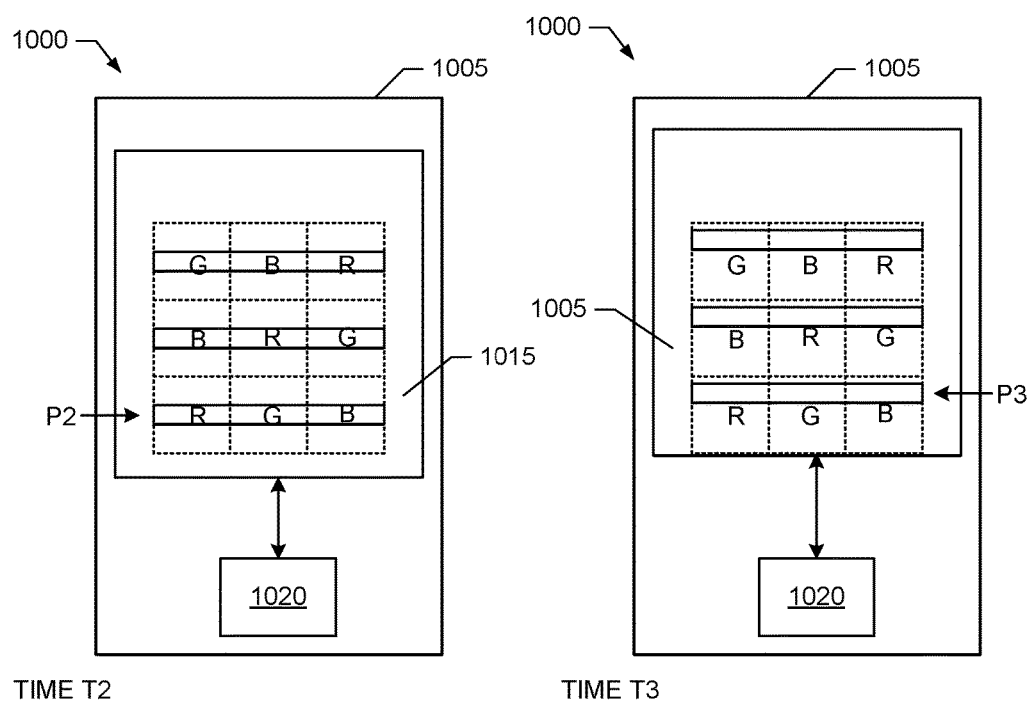
FIG. 10C
FIG. 10D

SUPER-RESOLUTION DISPLAYS AND METHODS OF OPERATING THE SAME

FIELD OF THE DISCLOSURE

This disclosure relates generally to virtual reality (VR) head-mounted displays, and, more particularly, to super-resolution VR head-mounted displays, and methods of operating the same.

BACKGROUND

VR head-mounted displays include a light-emitting portion that enables a wearer to be visually immersed in, for example, a three dimensional (3D) virtual experience.

SUMMARY

Super-resolution VR head-mounted displays, and methods of operating the same are disclosed herein. An example disclosed method includes emitting light from a pixel at a first location in a display assembly in a VR head-mounted display, and emitting light from the pixel at a second different location in the display assembly in the VR head-mounted display.

An example disclosed display assembly for use in a VR head-mounted display includes a light emitting portion configured to emit light from a pixel at a first time and at a first location in the VR head-mounted display, and a movement to move a portion of the display assembly to emit light from the pixel at a second time and at a second different location in the VR head-mounted display.

An example disclosed display assembly for use in a VR head-mounted display includes a light emitting portion configured to emit light at a first time from a pixel at a first location in the VR head-mounted display, and a layer configurable to direct light emitted from the pixel at a second time and at a second different location in the VR head-mounted display.

BRIEF DESCRIPTION OF THE DRAWINGS

FIGS. 10A-E illustrate still another example super-resolution display assembly and a method of operating the same in accordance with the teachings of this disclosure.

FIG. 11 illustrates yet another example super-resolution display assembly and a method of operating the same in accordance with the teachings of this disclosure.

DETAILED DESCRIPTION

Figure 1:
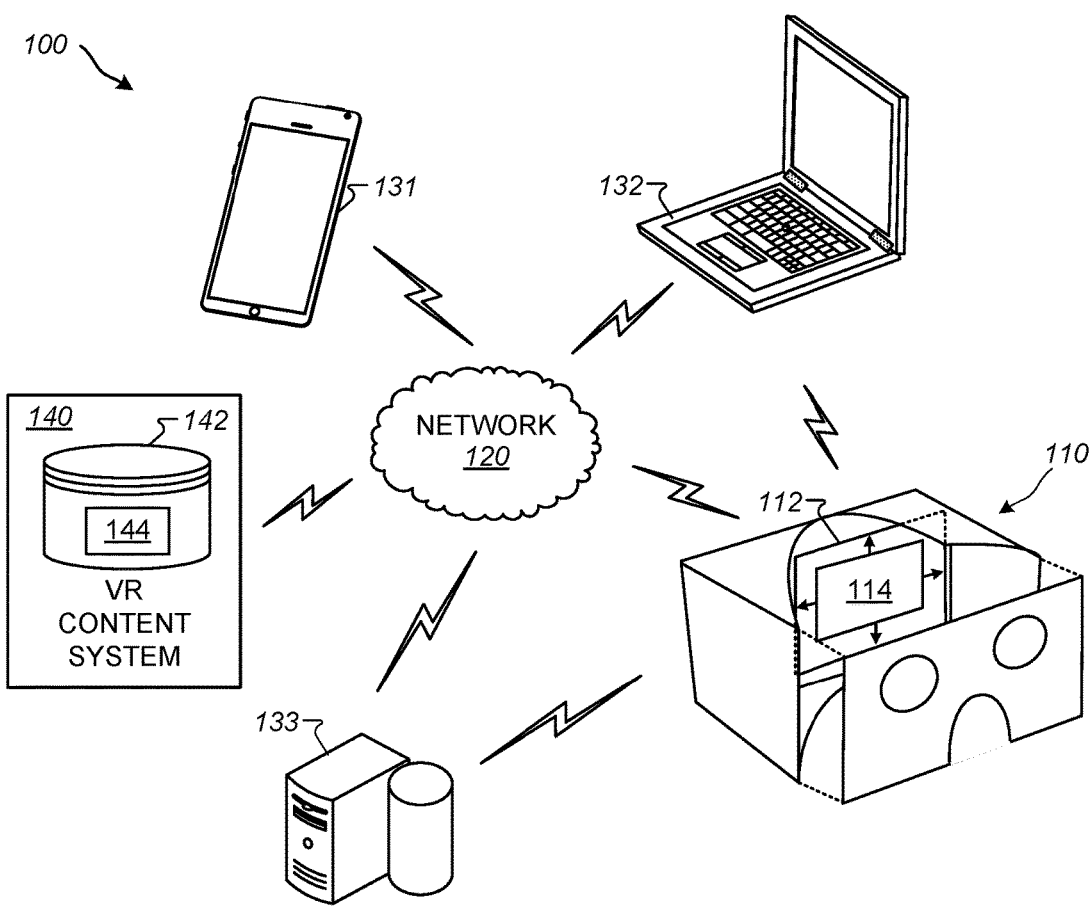
FIG. 1 is a schematic illustration of an example VR system including a head-mounted display having a super-resolution display assembly in accordance with the teachings of this disclosure.

There is a need for near-to-eye virtual reality and/or augmented reality (AR) head-mounted displays having display assemblies with light-emitting portions providing higher pixel densities (e.g., 2000 pixels per inch) than conventional head-mounted displays to better match the acuity of the human visual system. To provide a sufficiently large field of view, a relatively large size (e.g., 2 inches diagonally) light-emitting portion is needed. Conventional light-emitting portions do not meet these requirements. For example, conventional light-emitting portions, such as an organic light-emitting diode (OLED) device, a liquid crystal displays (LCD) device, a light-emitting diode (LED) device, and those used in smartphones and other devices, cannot achieve the required pixel density. For instance, OLED devices cannot achieve the required pixel density due to the shadow mask evaporative process used to form their pixels. Smaller conventional OLED light-emitting portions, such as those used in camera viewfinders, cannot be readily scaled to a sufficient size.

Example super-resolution VR head-mounted displays, and methods of operating the same that overcome at least these deficiencies are disclosed herein. Advantageously, the examples disclosed herein may be constructed using, for example, OLED, LCD and LED light-emitting portion technologies. However, they may additionally or alternatively be constructed using other past, present and future light-emitting portion technologies. Example display assemblies disclosed herein selectively control, position and operate a light-emitting portion to display images at different locations for viewing by a wearer of a VR head-mounted display. In some examples, an image is displayed at a first location, and a potentially different image is displayed at a second location at a different time. In some examples, the first and second locations differ by as little as a pixel or sub-pixel. When pixels of the latter image are displayed between the pixels of the former image, then a higher effective or perceived resolution image can be realized. The images may differ or be the same. In some examples, a light-emitting portion is physically translated between two or more physically different positions using a selectively controllable member such as an actuator or oscillator. At each position, a different or the same image is shown. In other examples, a selectively controllable member such as a mask or glass sheet located between a light-emitting portion and a wearer may be moved; a selectively controllable member such as a light-emitting portion could be flexed; a selectively controllable member such as a liquid crystal layer between a light-emitting portion and a wearer could have its refractive index selectively changed to selectively deflect light, etc. Any combination thereof may also be realized. These may be selectively controlled via changeable or controllable light-emitting portion parameters that include, but are not limited to, a light-emitting portion position, a mask position, a sheet position, a flex amount, a liquid crystal refractive index, etc.

FIG. 1 is a block diagram of an example VR system 100 including a head-mounted display 110 having a super-resolution display assembly 112 constructed in accordance with the teachings of this disclosure. In general, the example VR system 100 provides a VR environment and VR content for a wearer to access, view, and/or interact with. The example system 100 provides the wearer with options for accessing the VR content, virtual objects, and/or VR controls using, for example, eye gaze and/or movements within the VR environment. For example, when the user interacts with a target presented in the VR environment, the system 100 detects the movement or interaction, and displays a number of selectable areas within the VR environment (e.g., targets) that at least a portion of the user can pass through or interact with to trigger immediate or near immediate action (e.g., functionality).

As shown in FIG. 1, the example VR system 100 includes a plurality of computing and electronic devices that can exchange data over a network 120. The devices may represent clients or servers, and can communicate via the network 120 and other network(s). Example client devices include, but are not limited to, a mobile device 131 (e.g., a smartphone, a personal digital assistant, a portable media player, etc.), an electronic tablet, a laptop or netbook 132, a camera, the head-mounted display 110, a desktop computer 133, a gaming device, and any other electronic or computing devices that can communicate using the network 120 or other network(s) with other computing or electronic devices or systems, or that may be used to access VR content or operate within a VR environment. The devices 110 and 131-133 may represent client devices. In some examples, the devices 110 and 131-133 include one or more processors and one or more memory devices, which can execute a client operating system and one or more client applications that can access, control, and light-emitting portion VR content on a light-emitting portion device implemented together with each respective device.

To playback, present or otherwise display still and moving images or pictures for a wearer, the example head-mounted display 110 of FIG. 1 includes a super-resolution display assembly 112 in accordance with the teachings of this disclosure. The example display assembly 112 of FIG. 1 has at least one light-emitting portion 114. Light-emitting portions emit light outward from a surface of the light-emitting portion. The angle of view of the light-emitting portion, i.e., the angle over which light is emitted, can depend on design and/or technology. While light is typically emitted across a range of angles, for clarity of illustration and ease of description, reference will be made to light that is emitted in a direction that is generally perpendicular to the surface of the light-emitting portion. Light emitted at other angles can be shifted using methods and apparatus analogous to those described and shown herein. Various example display assemblies 112 in accordance with the teachings of this disclosure will be described in more detail below.

Figure 2:
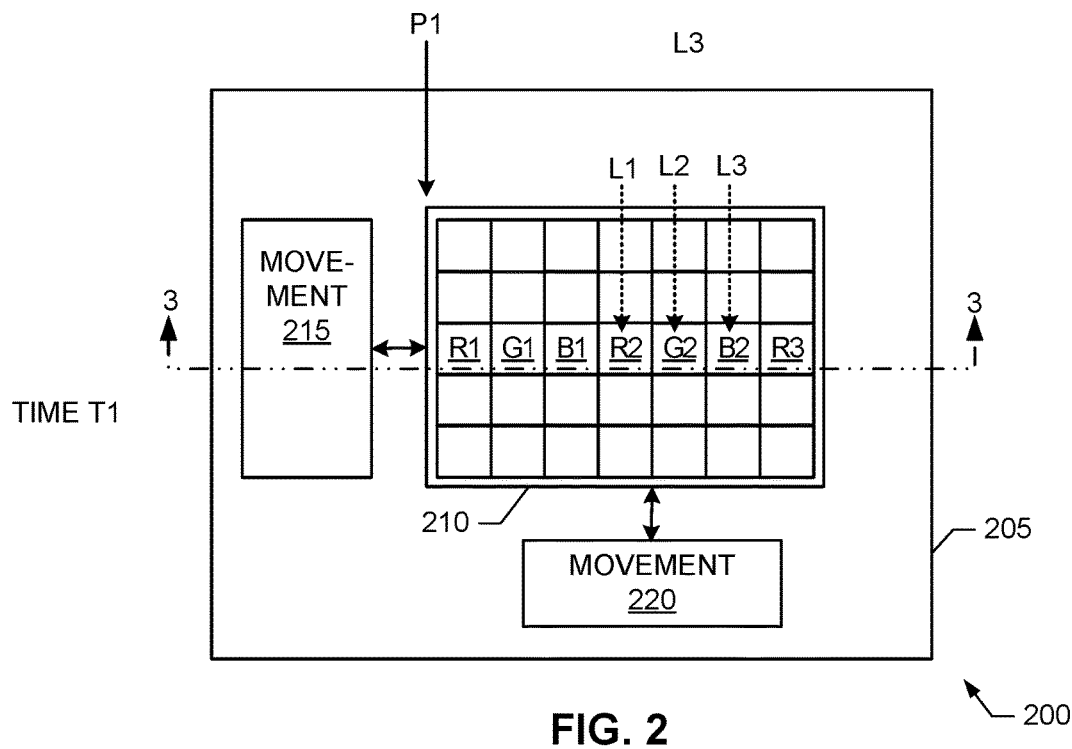
FIGS. 2 and 3 are respectively top view and side cross-sectional views of an example display assembly in accordance with the teachings of this disclosure.
Figure 3:
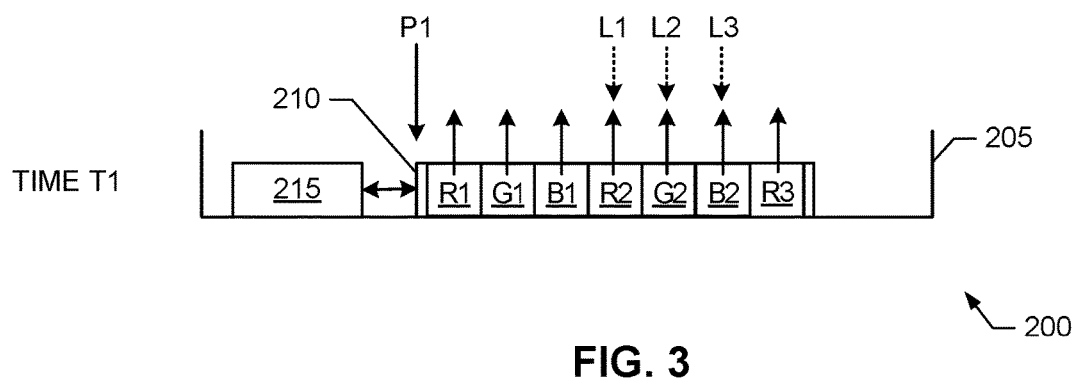

FIG. 2 is a top view of an example display assembly 200 in accordance with the teachings of this disclosure. FIG. 3 is a side cross-sectional view of the display assembly 200 of FIG. 2 taken along line 3-3. The example display assembly 200 of FIGS. 2 and 3 may be used to implement the example display assembly 112 of FIG. 1. The display assembly 200 has any type of housing, mount, package, bracket, compartment, etc. 205 in which a light-emitting portion 210 can be provided. The light-emitting portion 210 may be any type of light-emitting portion 205, such as, but not limited to, an OLED light-emitting portion, an LCD light-emitting portion, an LED light-emitting portion, etc. However, the light-emitting portion 210 may additionally or alternatively be formed of other past, present and future light-emitting portion technologies.

To translate, oscillate or otherwise move the light-emitting portion 210, the example display assembly 200 includes one or more movements 215 and 220. In the example shown in FIG. 2, the movements 215 and 220 move the light-emitting portion 210 forward and backward along respective orthogonal directions. Thus, the movements 215 and 220 can, for example, collectively move the light-emitting portion 210 according to a grid. However, a display assembly may have additional and/or alternative movements, and/or a light-emitting portion may be moved according to other patterns. Other example patterns include, but are not limited to, diagonally, circularly, etc. Moreover, the movements 215 and 220 need not be the same, need not move in the same fashion, and need not have the same range of movement, etc. Example movements 215 and 220 include linear actuators, piezo-electric oscillators, etc. While not shown in FIGS. 2 and 3 for sake of clarity, there may be a controller, processor, circuit, or computing device that controls the movements 215 and 220, and what is displayed by the light-emitting portion 210. The controller, processor, circuit, or computing device may be included in the display assembly, be implemented elsewhere in a head-mounted display, or a device communicatively coupled to the movements 215 and 220 within a head-mounted device. In some examples, a computing device such as one using the method shown in FIG. 13 may be used to control the movements 215 and 220, and to coordinate the displaying of images by the light-emitting portion 210 with movement(s) of the movements 215 and 220.

In at least the example of FIGS. 2-6, the light-emitting portion 210 has a repeating or regular pattern of red, green and blue pixels, R1, G1, B1, etc. While for clarity of explanation and illustration references are made to a repeating pattern of red, green and blue pixels, pixels of other colors may be used, different combinations of colored pixels may be used, different patterns of colored pixels may be used, etc. Another example pixel arrangement is discussed below in connection with FIGS. 7 and 8A-D.

If the example light-emitting portion 210 is operated conventionally, that is, without moving the light-emitting portion 210, the smallest area that has contributions from a red, a green, and a blue pixel has a dimension of 3 pixels along the line formed by the pixels R1, G1, B1, etc.

An example operation of the display assembly 200 in accordance with this disclosure will now be described with reference to FIGS. 2-6. While for ease of discussion and clarity of illustration reference will only be made to moving the light-emitting portion 210 in the rightward direction (in the orientation of FIGS. 2-6), it should be understood that the light-emitting portion 210 may be moved in a leftward direction, an upward direction, and/or a downward direction in a similar manner.

The example movements 215 and 220 selectively control, position, etc. the light-emitting portion 210 so a pixel, e.g., the pixel R2, of the light-emitting portion 210 emits light at different locations and different times. Starting with FIGS. 2 and 3, the light-emitting portion 210 is at a first position P1 at a first time T1 where the pixel R2 may emit light at a location L1. In a similar manner, the pixel B2 may emit light at a location L3. Whether a pixel emits light can be based on an image to be displayed, a setting, a preference, etc. A pixel may emit light at one time and not at another time.

Figure 4:
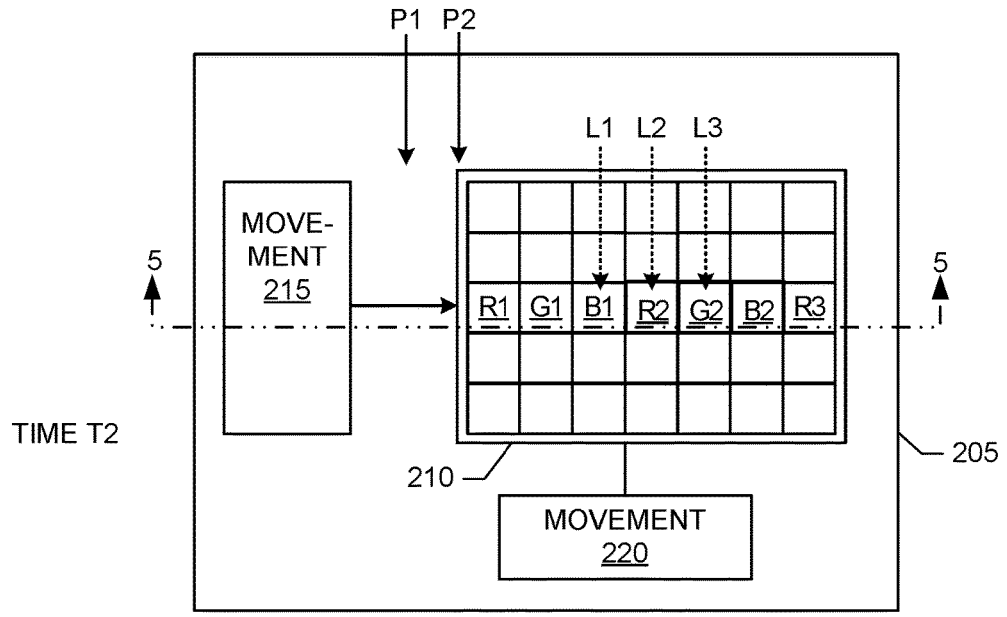
FIGS. 4 and 5 are respectively top and side cross-sectional views of the example display assembly of FIGS. 2 and 3, with a light-emitting portion in a different position in accordance with the teachings of this disclosure.
Figure 5:
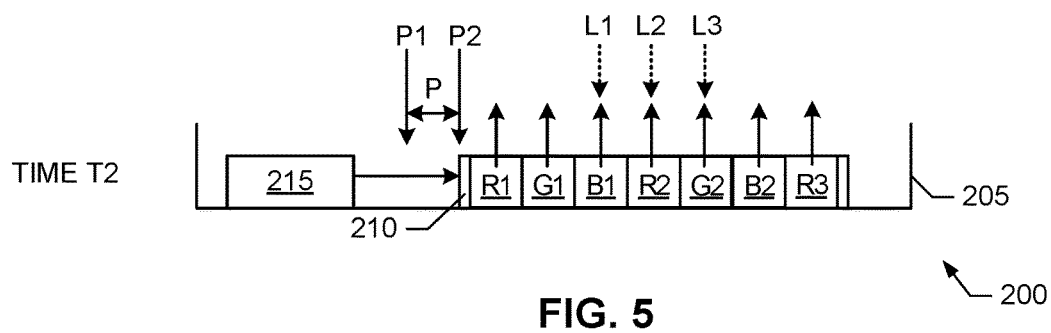

If the light-emitting portion 210 is shifted to the right (in the orientation of FIGS. 2-6) by the width P of each of the pixels R1, G1, B1, etc., the light-emitting portion 210 becomes positioned at a position P2 at a time T2, as shown in FIGS. 4 and 5. FIG. 4 is a top view of the example display assembly 200 of FIG. 2 with the light-emitting portion 210 shifted to the right to the position P2. FIG. 5 is a side cross-sectional view of the example display assembly 200 of FIG. 4 along the line 5-5. Again, like FIG. 4, the light-emitting portion 210 is at the position P2, and the pixel G2 may emit light at the location L3, and the pixel R2 may emit light at the location L2.

Figure 6:
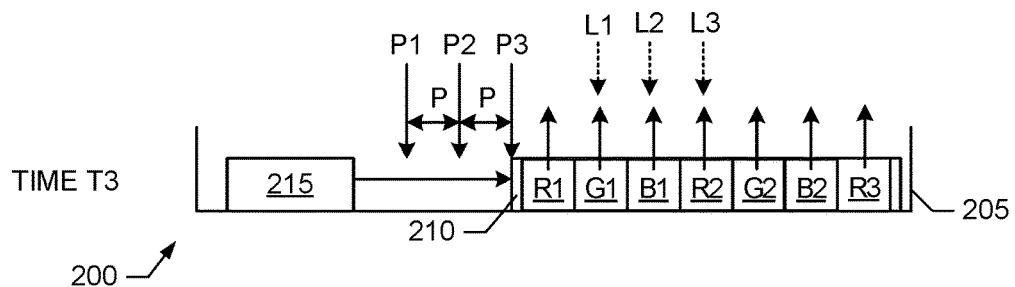
FIG. 6 is a side cross-sectional view of the example display assembly of FIGS. 2 and 3, with a light-emitting portion in another different position in accordance with the teachings of this disclosure.

If the light-emitting portion 210 is additionally shifted to the right (in the orientation of FIGS. 2-6) by the width P of the pixels R1, G1, B1, etc., the light-emitting portion 210 becomes positioned at position P3 at a third time T3, as shown in FIG. 6. With the light-emitting portion 210 at the position P3, the pixel R2 may emit light at the location L3.

Referring to the sequence of FIGS. 2-6, the pixel R2 successively emits light at the location L1, the location L2 and the location L3 at corresponding times T1, T2 and T3. That is, the pixel R2 may selectively emit light at different locations and/or different times. Additionally, all of the pixels R2, G2 and B2 had an opportunity to emit light at the location L3.

Taken collectively, the pixels R1, B1, G1, etc. can be used to show different images at different locations L1, L2, L3, etc. and/or positions P1, P2, P3, etc. as the shifts are applied to the light-emitting portion 210. In the example of FIGS. 2-6, the light-emitting portion 201 is shifted by the width of the pixels and, thus, the smallest area that may have contributions from a red, a green, and a blue pixel is the size of one pixel. Compared to a stationary light-emitting portion 206, resolution has effectively been increased along one axis by a factor of 3 (i.e., 3 shifts and 3 colors). If other shifts are used, the increase in resolution may be lesser or greater.

Figure 7:
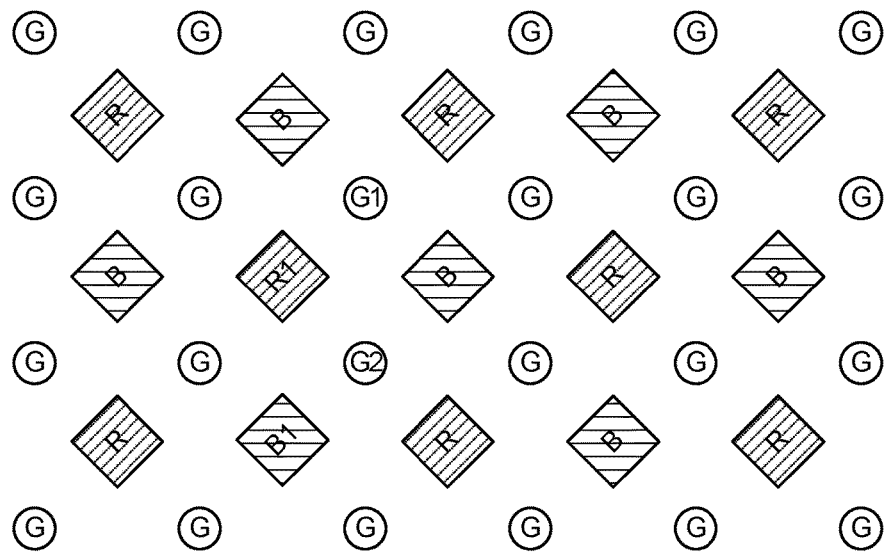
FIG. 7 is a top view of a pixel arrangement of an example light-emitting portion.

FIG. 7 is a top view of a portion of an example OLED light-emitting portion 700 that can be used in the example display assemblies disclosed herein. The example light-emitting portion 700 of FIG. 7 has a regularly-spaced two-dimensional arrangement of green, blue and red pixels, G1, B1, R1, etc. Other colors, combinations and/or patterns may alternatively and/or additionally be used.

Figures 8A, 8B, 8C, 8D:
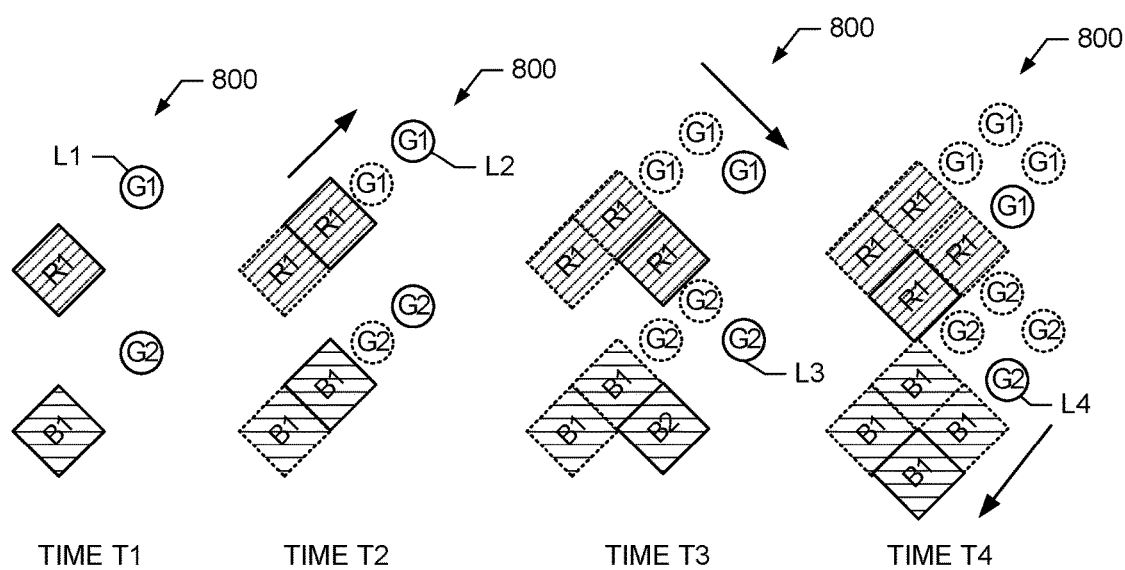
FIGS. 8A-8D are top views of a portion of the example light-emitting portion of FIG. 7 depicting an example operation of a display assembly performed in accordance with the teachings of this disclosure.

FIGS. 8A-D are top views of a portion 800 of the light-emitting portion 700 of FIG. 7. FIGS. 8B-D correspond to the portion 800 of FIG. 8A being respectively at three other or different locations or positions at different times. The example light-emitting portion 700 may be selectively moved, controlled, positioned and/or operated in ways similar to those disclosed above in connection with FIGS. 2-6. In some examples, the example movements shown in FIG. 8A-8D could be realized with movements acting on diagonals.

Starting with time T1 shown in FIG. 8A, green pixels G1 and G2, a blue pixel B1, and a red pixel R1 are displayed at respective first locations. At time T1, the pixels G1, G2, B1 and R1 can emit light at their corresponding first locations, one of which is designated at reference numeral L1. At a second time T2 shown in FIG. 8B, the pixels G1, G2, B1 and R1 have been shifted upward and to the right relative to the first positions of FIG. 8A (in the orientation of FIGS. 8A-D), thus the pixels G1, G2, B1 and R1 may emit light at the second locations shown in FIG. 8B. The second locations (one of which is designated at reference numeral L2) being upward and to the right relative to the first locations. In FIG. 8B, the first locations L1 of the pixels G1, G2, B1 and R1 are shown with dotted lines to depict their previous positions. FIGS. 8C and 8D will also use dotted lines to depict previous locations. At a third time T3 shown in FIG. 8C, the pixels G1, G2, B1 and R1 have been shifted downward and to the right, thus the pixels G1, G2, B1 and R1 may emit light at respective third locations, one of which is designated at reference numeral L3. Finally, at a fourth time T4 shown in FIG. 8D, the pixels G1, G2, B1 and R1 have been shifted downward and to the left, thus, the pixels G1, G2, B1 and R1 may emit light at the fourth locations of FIG. 8D, one of which is designated at reference number L4. Further shifts may be applied so that the pixel R1 moves to the location of pixel G1 in position P1-P4, pixel G2 in position P1-P4, and pixel B1 in position P1-P4, so that every point in the light-emitting area contains a red-emitting pixel for at least one position. As shown in FIGS. 8A-D, the pixels G1, G2, B1 and R1 can be extended generally up-and-to-the-right. The process can, additionally or alternatively, be performed for an up-and-to-the-left direction, a down-and-to-the left direction, and/or a down-and-to-the-right direction. The resolution increase achievable using the example of FIGS. 7 and 8A-8D depends on arrangement or pattern of pixel, spacing between pixels, ratio of size of black regions to color pixel size, etc. In the example of FIGS. 7 and 8A-D, a resolution increase of 12 can be obtained, without a decrease in fill factor.

Taken collectively, the pixels R1, B1, G1, etc. can be used to show different images at different locations L1, L2, L3, etc. and/or positions P1, P2, P3, etc. as the shifts are applied to the light-emitting portion 210.

Figure 9A:
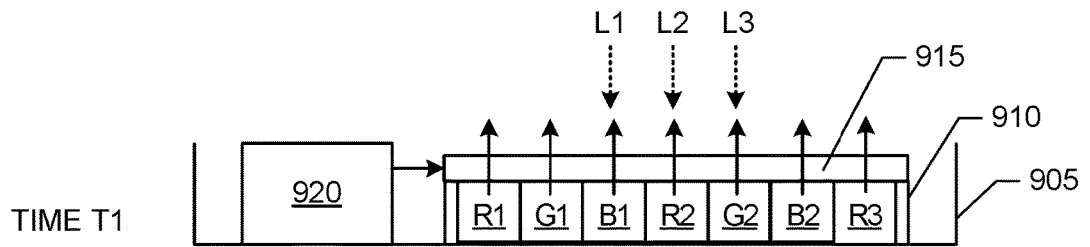
FIGS. 9A-9D are side cross-sectional views of another super-resolution display assembly in accordance with the teachings of this disclosure.
Figure 9B:
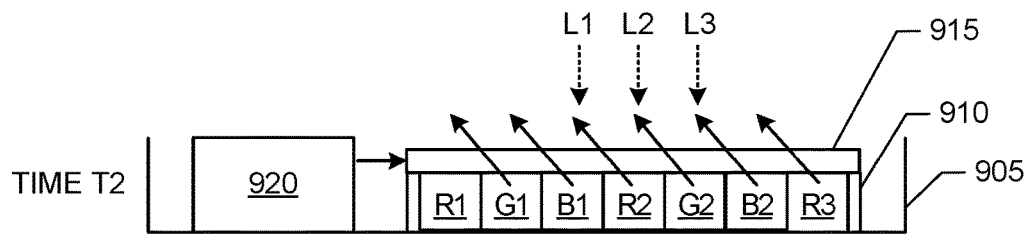
Figure 9C:
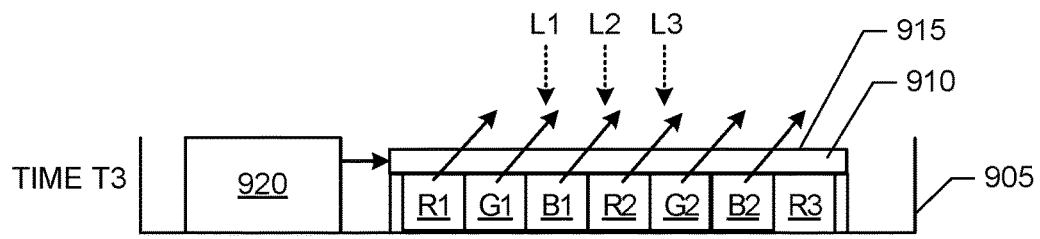

FIGS. 9A-C are side cross-sectional views of a further example display assembly 900 in accordance with the teachings of this disclosure. The example display assembly 900 of FIGS. 9A-C may be used to implement the example display assembly 112 of FIG. 1. The display assembly 900 has any type of housing, mount, package, bracket, compartment, etc. 905 in which a light-emitting portion 910 can be provided. The light-emitting portion 910 may be any type of light-emitting portion 905, such as, but not limited to, an OLED light-emitting portion, an LCD light-emitting portion, an LED light-emitting portion, etc. However, the light-emitting portion 910 may additionally or alternatively be formed of other past, present and future light-emitting portion technologies.

In FIGS. 9A-C, there is a layer 915 disposed between the light-emitting portion 910 and a person viewing light emitted by the light-emitting portion 910. In the orientation of FIGS. 9A-C, the person would be above the layer 915. The layer 915 is positioned above (in the orientation of FIGS. 9A-C), disposed above, adjacent to, or proximate to the light-emitting portion 915. The layer 915 can be against the light-emitting portion 910, or can be spaced apart from the light-emitting portion 910. The layer 915 has one or more selectively controllable characteristics that allow light emitted by the light-emitting portion 910 to exit the layer 915 at different positions or locations. In the example of FIGS. 9A-C, example light is shown to be emanating from the layer 915 at different angles via, for example, and angle-of-view. The layer 915 can be made, controlled, formed, etc. so the light emanates generally at the same angle (e.g., vertically in the orientation of FIGS. 9A-C) regardless of location.

To electrically control states of the layer 910, the example display assembly 900 includes one or more controllers, processors, circuits or computing devices 920. In the example shown in FIGS. 9A-C, the controller 920 electrically or wirelessly controls the state(s) of the layer 915. The controller 920 can be external to the display assembly 900 in a head-mounted, or in a computing device communicatively coupled to a head-mounted display. The computing devices of FIG. 14 may be used to implement the controller 920 of FIGS. 9A-C.

In the example of FIGS. 9A-C, the layer 915 can be controlled by the controller 920 to emit light from the layer 915 at three different angles, even while light emitted by the light-emitting portion 910 is emitted upward. For example, in FIG. 9A, the controller 920 controls or has controlled the layer 915 to emit light in a vertical direction. In FIG. 9B, the controller 920 controls or has controlled the layer 915 to emit light in an upward-leftward direction. FIG. 9C the controller 920 controls or has controlled the layer 915 to emit light in an upward-rightward direction.

Referring to the sequence of FIGS. 9A-C, the pixel R2 successively emits light at location L1, location L2 and location L3 at corresponding times T1, T2 and T3. That is, the pixel R2 may selectively emit light at different locations and/or different times. Additionally, all of the pixels R2, G2 and B2 had an opportunity to emit light at the location L3.

The layer 915 may be constructed using, for example, an electrically controllable array of micro-lenses, an electrically controllable layer of liquid crystal material, etc. For example, a liquid crystal layer may be configured in a flat or sawtooth configuration, and be electrically controllable to emit light at different angles or positions by controlling its refractive index to be different at different times.

Figure 9D:
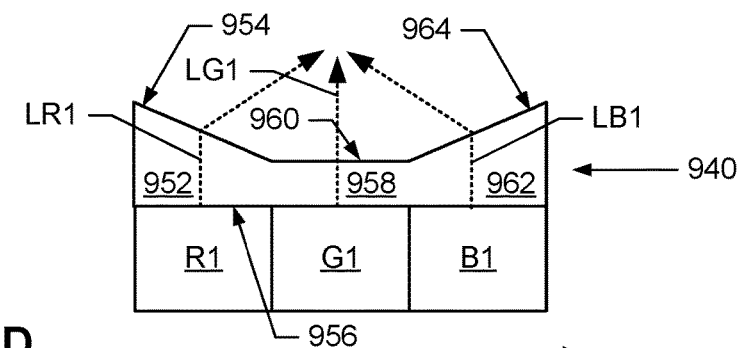

In an example shown in FIG. 9D, the layer 915 is a movable sheet or panel formed of, for example, glass or plastic, and having light guide wedges and flat segments that can be used to implement the example layer 915 of FIGS. 9A-C. Example wedges and segments shown in FIG. 9D are each the width of a pixel P. One end portion of a triplet 950 has a first wedge 952 having a sloped top surface 954 at one end of the triplet 950 facing a middle portion 958 of the triplet 950, and a flat bottom surface 956. A middle flat segment portion 958 of the triplet 950 has flat top and bottom surfaces 960 and 956. Another end portion of the triplet 950 has a wedge 962 with a sloped top surface 964 at the other one end of the triplet 950 facing the middle portion 958 of the triplet 950, and a flat bottom surface 956. As shown in FIG. 9D, the wedges 952 and 962 bend light LR1 and LB1 respectively emitted by the pixels R1 and B1, and light LG1 emitted by the pixel G1 passes straight through the triplet 950 without deflection. Accordingly, all three colors may be emitted at the same location or position at the same time. Instead of electrically controlling the triplets 950, the layer 910 can be moved similarly to FIGS. 2-6, 7 and 8A-D. As the triplets move, pixels emit light a different locations, and all three of the colors can be emitted at each of the pixel locations at the same time.

Figures 10E, 11:
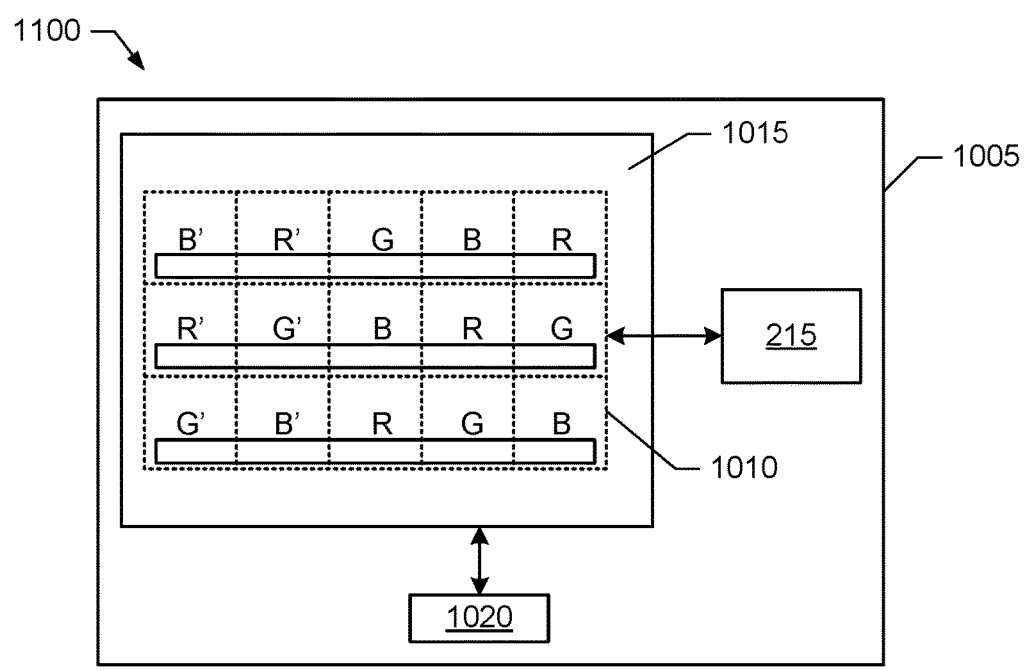

Turning to FIGS. 10A-E, still another example display assembly 1000 and an operation thereof in accordance with the teachings of this disclosure is shown. FIG. 10A is a top view of the example display assembly 1000, and FIG. 10B is a side cross-section view of the display assembly 1000 of FIG. 10A taken along line 10-10. The example display assembly 1000 of FIGS. 10A-E may be used to implement the example display assembly 112 of FIG. 1. The display assembly 1000 has any type of housing, mount, package, bracket, compartment, etc. 1005 in which a light-emitting portion 1010 can be provided. The light-emitting portion 1010 may be any type of light-emitting portion 1005, such as, but not limited to, an OLED light-emitting portion, an LCD light-emitting portion, an LED light-emitting portion, etc. However, the light-emitting portion 1010 may additionally or alternatively be formed of other past, present and future light-emitting portion technologies In FIGS. 10A-E, there is a layer 1015 disposed between a light-emitting portion 1010 and a person viewing light emitted by the light-emitting portion 1010. The layer 1015 is positioned above (in the orientation of FIGS. 10A-E), disposed above, adjacent to, or proximate to the light-emitting portion 1010. The layer 1015 can be against the light-emitting portion 1010, or can be spaced apart from the light-emitting portion 1010. The light-emitting portion 1010 has a regular pattern of red, green and blue pixels, but any arrangement of pixels can be used. The example layer 1015 of FIGS. 10A-E has a series of holes, slots or openings 1017 defined therethrough (one of which is designated at reference numeral 1025).

To translate, oscillate or otherwise move the layer 1015, the example display assembly 1000 includes one or more movements 1020. In the example shown in FIGS. 10A and 10B, the movement 1020 moves the layer 1015 upward and downward (in the orientation of FIG. 10A), and leftward and rightward (in the orientation of FIG. 10B). Additional and/or alternative movements may be included and moved according to other directions. The movements 1020 can include linear actuators, piezo-electric oscillators, etc. While not shown in FIGS. 10A-E for sake of clarity, there may be a controller, processor, circuit, or computing device that controls the movement 1020. The controller, processor, circuit, or computing device may be included in the display assembly, be implemented elsewhere in a head-mounted display, or by a device communicatively coupled to a head-mounted display. In some examples, a computing device such as those shown in FIG. 13 may be used to control the movement 1020, and to coordinate the displaying of images by the light-emitting portion 1010 with movement(s) of the movement 1020. Compared to FIGS. 9A-C, the layer 1015 of FIGS. 10A-E can be moved.

An example operation of the display assembly 1000 in accordance with this disclosure will now be described in reference to FIGS. 10A-E. While for ease of discussion and clarity of illustration, reference will only be made to moving the layer 1015 upward (in the orientation of FIGS. 10A, 10C and 10-D), it should be understand that the layer 1015 may be moved in other directions in a similar manner.

Referring first to FIG. 10A, at a first time T1, each of the slots 1017 is aligned at respective bottom locations P1 (in the orientation of FIG. 10A) of the horizontal rows of pixels. At the time T1, any combination of R, G & B can be emitted through the slot 1017, thus, forming a first triplet TR1 (see FIG. 10E). Turning to FIG. 10C, at a second time T2, each of the holes 1017 is aligned at respective middle locations P2 of the horizontal rows of pixels. At the time T2, any combination of R, G & B can be emitted through the slot 1017, thus, forming a second triplet TR2. Turning to FIG. 10D, at a third time T3, each of the holes 1017 is aligned at respective upper locations P3 of the horizontal rows of pixels. At the time T3, any combination of R, G & B can be emitted through the slot 1017, thus, forming a third triplet TR3. The light emitted for each position of the holes 1017 may be the same or different. Because the triplets are smaller than the pixels from which they were formed, the resolution is increased vertically by a factor of three (3).

Turning to FIG. 11, another example display assembly 1100 and method operating the same in accordance with this disclosure are shown. The example display assembly 1100 incorporates the up and down movement of the layer 1015 described above in the example of FIGS. 10A-E, and the right and left movement of the light emitting portion 1010 described above in example of FIGS. 2-6. By combining the two movements the resolution can be increased by a factor of 9 (3 in the right-left direction, and 3 in the up-down direction.

Figure 12A:
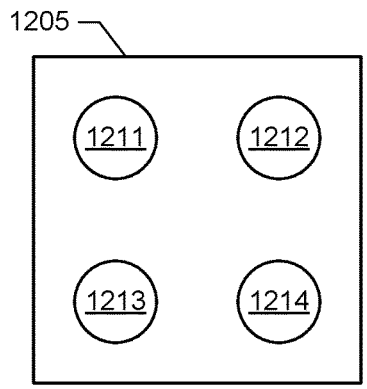
FIGS. 12A-C illustrate a further example super-resolution display assembly and a method of operating the same in accordance with the teachings of this disclosure
Figure 12B:
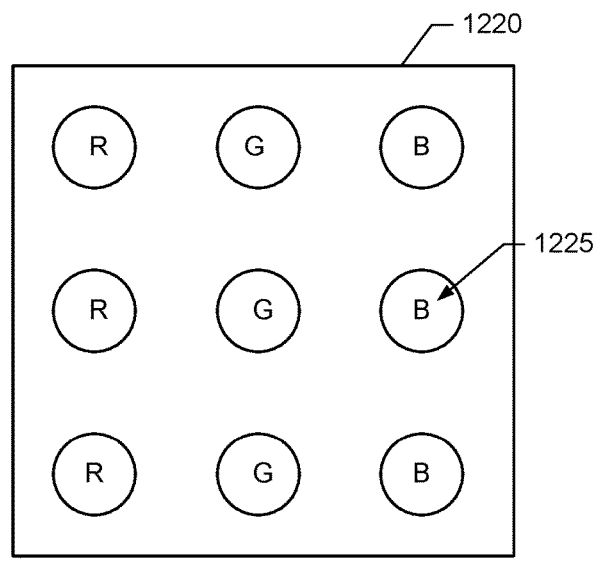
Figure 12C:
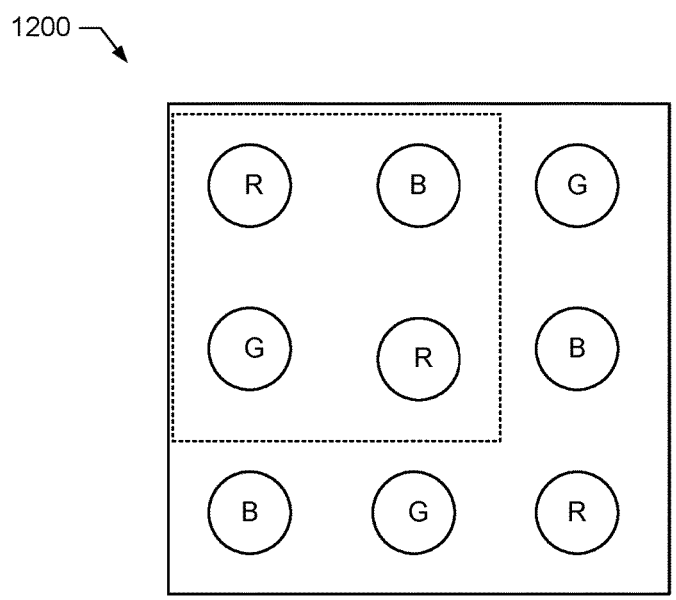

Turning to FIGS. 12A-C, a portion of still another example display assembly 1200 and method operating the same in accordance with this disclosure are shown. FIG. 12A depicts a pixel 1205 having four light emitting areas 1211-1214. FIG. 12B is a layer in the form of a mask 1220 have a plurality of openings (one of which is designated with reference numeral 1225) that have a respective colored material therein. In the example of FIG. 12B, the openings can be colored red R, green G, or blue B. When, as shown in FIG. 12, the mask 1220 is placed over the pixel 1205 at different positions, and the light-emitting areas 1211-1214 illuminate different colors, thereby forming different colors emitted by the example display assembly 1200.

Using the examples disclosed herein, images may be emitted at different locations separated by any distance(s) to increase display assembly resolution. Separations may be varied with time and/or direction. Other methods of causing images to be emitted at different locations are contemplated. For example, a light-emitting portion could be flexed to change where images are emitted. The movement of images between locations may be move and hold, or continuously moving with overlapping or partial pixels, etc.

The images to be displayed can be determined, rendered and/or otherwise generated using any number of methods. For example, a higher resolution image can be downsized to form two or more lower resolution images that are displayed at different locations by one of the display assemblies disclosed here. Further, images can be reprocessed, possibly with previous and next frames, to provide higher resolution images in space and time. Moreover, images can be rendered to sub-images for different times and locations.

Figure 13:
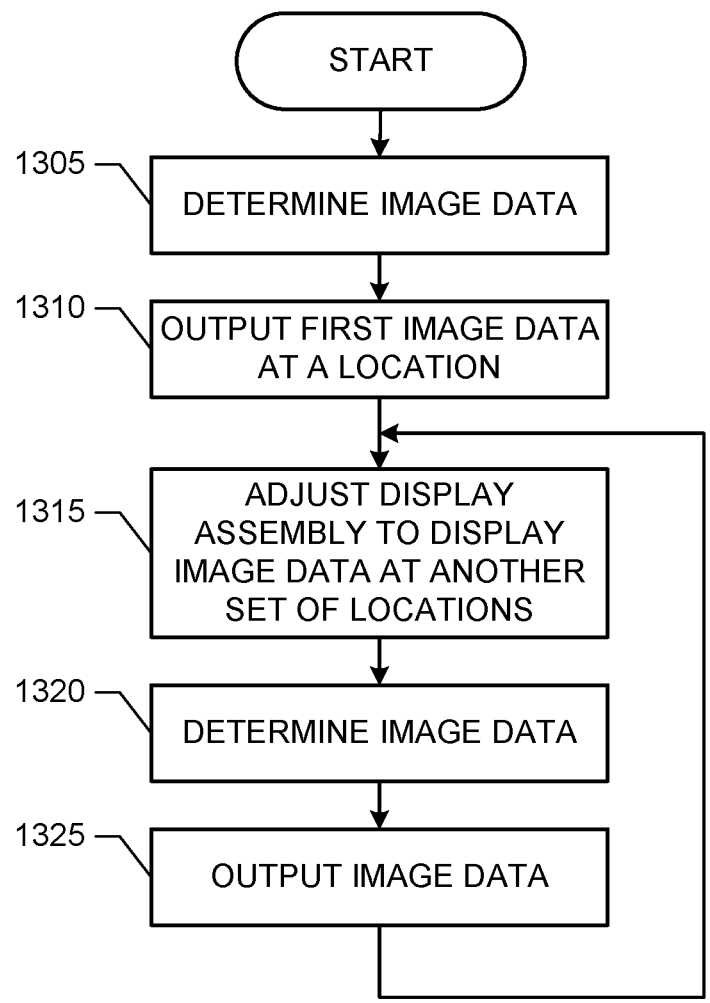
FIG. 13 is a flowchart illustrating an example method that may, for example, be implemented using machine-readable instructions executed by one or more processors to operate the example super-resolution display assemblies disclosed herein.

Turning to FIG. 13, an example method that may be carried out to control and operate the example display assemblies disclosed herein is shown. The example method of FIG. 10 begins with determining image data using any number and/or type(s) of methods, algorithms, circuits, machine-readable instructions, etc. (block 1305). For example, an image having a higher resolution than a light-emitting portion can be downsized to form a plurality of lower-resolution images matching the resolution of the light-emitting portion. Because the lower-resolution images can be interlaced, displaying them using the methods described above collectively can display the higher resolution image using a lower resolution light-emitting portion.

First image data (e.g., one of the lower resolution images) is displayed at a first location (block 1310). The display assembly is adjusted to display images at a second location (block 1315). Next image data (e.g., a next of the lower resolution images) is determined (block 1020), and the image data is displayed at the second location (block 1320). For example, such that the two lower resolution images are interlaced. Control returns to block 1325 until images have been displayed at all locations.

The example methods of FIG. 13 may, for example, be implemented as machine-readable instructions carried out by one or more processors to control or operate the example display assemblies disclosed herein. A processor, a controller and/or any other suitable processing device may be used, configured and/or programmed to execute and/or carry out the example method of FIG. 13. For example, the example method of FIG. 14 may be embodied in program code and/or machine-readable instructions stored on a tangible and/or non-transitory computer-readable medium accessible by a processor, a computer and/or other machine having a processor, such as that discussed below in connection with FIG. 14. Machine-readable instructions comprise, for example, instructions that cause a processor, a computer and/or a machine having a processor to perform one or more particular processes. Many other methods of implementing the example method of FIG. 13 may be employed. For example, the order of execution may be changed, and/or one or more of the blocks and/or interactions described may be changed, eliminated, sub-divided, or combined. Additionally, any or the entire example methods of FIG. 13 may be carried out sequentially and/or carried out in parallel by, for example, separate processing threads, processors, devices, discrete logic, circuits, etc.

As used herein, the term "computer-readable medium" is expressly defined to include any type of tangible or non-transitory computer-readable medium and to expressly exclude propagating signals. Example computer-readable medium include, but are not limited to, a volatile and/or non-volatile memory, a volatile and/or non-volatile memory device, a compact disc (CD), a digital versatile disc (DVD), a read-only memory (ROM), a random-access memory (RAM), a programmable ROM (PROM), an electronically-programmable ROM (EPROM), an electronically-erasable PROM (EEPROM), an optical storage disk, an optical storage device, a magnetic storage disk, a magnetic storage device, a cache, and/or any other storage media in which information is stored for any duration (e.g., for extended time periods, permanently, brief instances, for temporarily buffering, and/or for caching of the information) and that can be accessed by a processor, a computer and/or other machine having a processor.

Returning to FIG. 1, the example network 120 may be constructed using any number and type(s) of private and/or public networks including, but not limited to, the Internet, a cellular data network, a coaxial cable network, a dialup or broadband modem over a telephone network, a Wi-Fi® hotspot, a private communications network (e.g., a private local area network (LAN), a wireless local area network (WLAN), a leased line), etc.

The example system 100 of FIG. 1 further includes a VR content system 140. The VR content system 140 may represent a server device. The example VR content system 140 of FIG. 1 includes any number of repositories 142 storing content and/or virtual reality applications 144 that can generate, modify, and execute VR scenes.

The example head-mounted display 110 of FIG. 1 may include, for instance, a VR headset, glasses, an eyepiece, or any other wearable device capable of displaying VR content. In operation, the head-mounted display 110 can, for example, execute a VR application 144 that can playback, present or display received or processed images to a user. However, images may be played back, presented and light-emitting portioned by the head-mounted display 110 without need for a VR application 144. In some implementations, a VR application 144 of the head-mounted display 110 is hosted by one or more of the devices 131-133 shown in FIG. 1.

The one or more VR applications 144 of FIG. 1 can be configured to execute on any or all of the devices 110 and 131-133. The head-mounted display 110 can be communicatively coupled to one or more of the devices 110 and 131-133 to access VR content stored on or accessible via the VR content system 140. The devices 131-133 can be communicatively coupled (wired and/or wirelessly) to the head-mounted display 110, which can provide VR content for light-emitting portion on the head-mounted display 110.

The example head-mounted display 110 may be wirelessly coupled to the devices 131-133 via any combination of wireless networks and/or protocols such as, but not limited to, any of the Institute of Electrical and Electronics Engineers (IEEE®) 802.11x family of standards, Wi-Fi, Bluetooth®, etc.

In the event the head-mounted display 110 is electrically coupled to one or more of the devices 131-133, a cable with an appropriate connector on either end for plugging into the devices 110 and 131-133 may be used. For example, the cable can include a Universal Serial Bus (USB) connector on both ends. The USB connectors can be the same USB type connector, or the USB connectors can each be a different type of USB connector. The various types of USB connectors include, but are not limited to, USB A-type connectors, USB B-type connectors, micro-USB A connectors, micro-USB B connectors, micro-USB AB connectors, USB five pin Mini-b connectors, USB four pin Mini-b connectors, USB 3.0 A-type connectors, USB 3.0 B-type connectors, USB 3.0 Micro B connectors, and USB C-type connectors.

In some implementations, the mobile device 131 executes the VR application(s) 144 and provides the content for the VR environment. In some implementations, the laptop computing device 132 executes the VR application(s) 144 and provides content from one or more content servers (e.g., the VR content server 140). In some implementations, the desktop computing device 133 executes the VR application(s) 144 and provides content from one or more content servers (e.g., the VR content server 140). The one or more content servers 140 and one or more computer-readable storage devices 142 can communicate with the mobile device 131, the laptop computing device 132, and/or the desktop computing device 133 using the network 120 to provide content for light-emitting portion in the head-mounted display 110.

Figure 14:
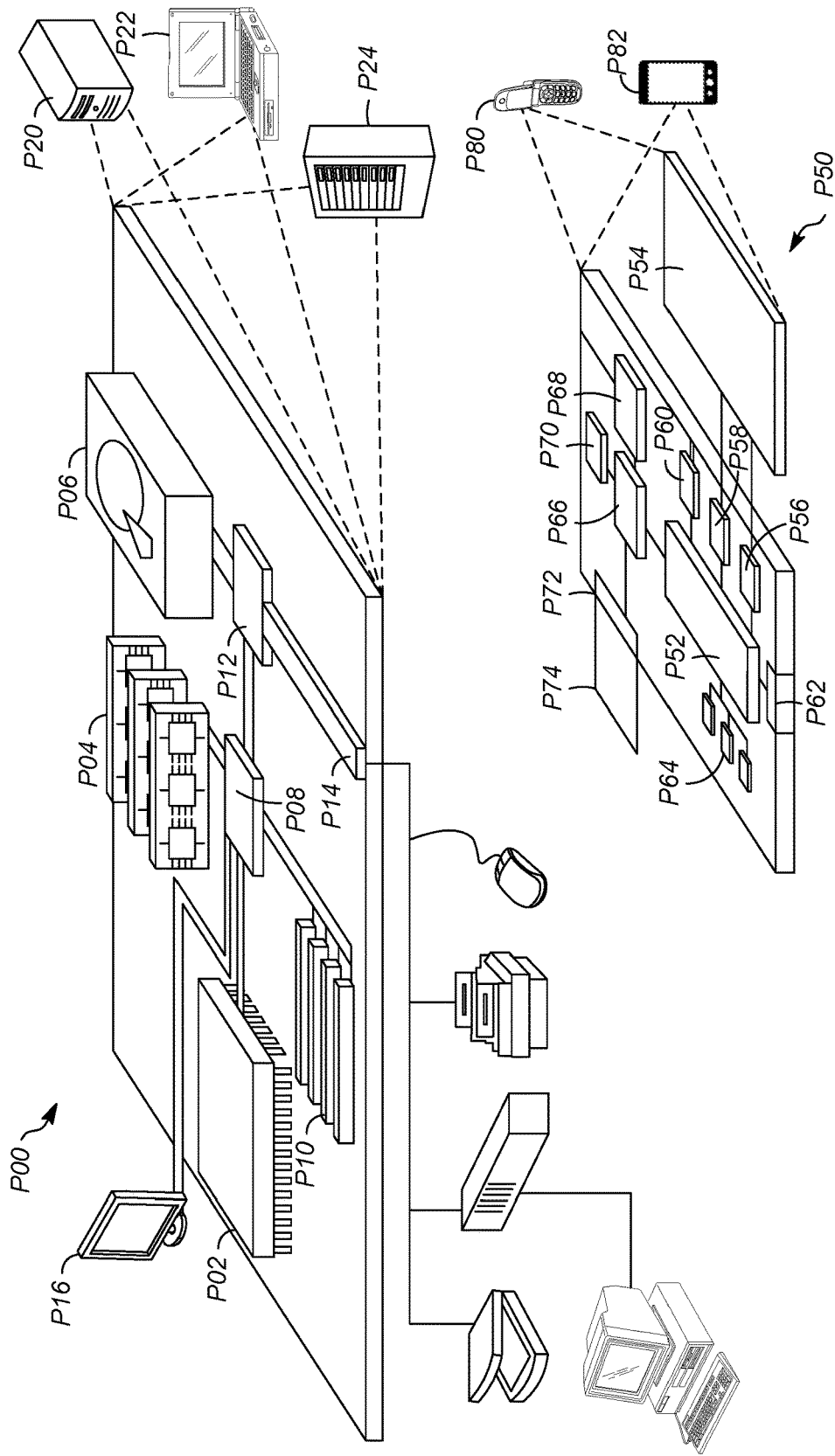
FIG. 14 is a block diagram of an example computer device and an example mobile computer device, which may be used to implement the examples disclosed herein.

FIG. 14 shows an example of a generic computer device P00 and a generic mobile computer device P50, which may be used with the techniques described here. Computing device P00 is intended to represent various forms of digital computers, such as laptops, desktops, tablets, workstations, personal digital assistants, televisions, servers, blade servers, mainframes, and other appropriate computing devices. Computing device P50 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device P00 includes a processor P02, memory P04, a storage device P06, a high-speed interface P08 connecting to memory P04 and high-speed expansion ports P10, and a low speed interface P12 connecting to low speed bus P14 and storage device P06. The processor P02 can be a semiconductor-based processor. The memory P04 can be a semiconductor-based memory. Each of the components P02, P04, P06, P08, P10, and P12, are interconnected using various busses, and may be mounted on a common motherboard or in other manners as appropriate. The processor P02 can process instructions for execution within the computing device P00, including instructions stored in the memory P04 or on the storage device P06 to light-emitting portion graphical information for a GUI on an external input/output device, such as light-emitting portion P16 coupled to high speed interface P08. In other implementations, multiple processors and/or multiple buses may be used, as appropriate, along with multiple memories and types of memory. Also, multiple computing devices P00 may be connected, with each device providing portions of the necessary operations (e.g., as a server bank, a group of blade servers, or a multi-processor system).

The memory P04 stores information within the computing device P00. In one implementation, the memory P04 is a volatile memory unit or units. In another implementation, the memory P04 is a non-volatile memory unit or units. The memory P04 may also be another form of computer-readable medium, such as a magnetic or optical disk.

The storage device P06 is capable of providing mass storage for the computing device P00. In one implementation, the storage device P06 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory P04, the storage device P06, or memory on processor P02.

The high speed controller P08 manages bandwidth-intensive operations for the computing device P00, while the low speed controller P12 manages lower bandwidth-intensive operations. Such allocation of functions is exemplary only. In one implementation, the high-speed controller P08 is coupled to memory P04, light-emitting portion P16 (e.g., through a graphics processor or accelerator), and to high-speed expansion ports P10, which may accept various expansion cards (not shown). In the implementation, low-speed controller P12 is coupled to storage device P06 and low-speed expansion port P14. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device P00 may be implemented in a number of different forms, as shown in the figure. For example, it may be implemented as a standard server P20, or multiple times in a group of such servers. It may also be implemented as part of a rack server system P24. In addition, it may be implemented in a personal computer such as a laptop computer P22. Alternatively, components from computing device P00 may be combined with other components in a mobile device (not shown), such as device P50. Each of such devices may contain one or more of computing device P00, P50, and an entire system may be made up of multiple computing devices P00, P50 communicating with each other.

Computing device P50 includes a processor P52, memory P64, an input/output device such as a light-emitting portion P54, a communication interface P66, and a transceiver P68, among other components. The device P50 may also be provided with a storage device, such as a microdrive or other device, to provide additional storage. Each of the components P50, P52, P64, P54, P66, and P68, are interconnected using various buses, and several of the components may be mounted on a common motherboard or in other manners as appropriate.

The processor P52 can execute instructions within the computing device P50, including instructions stored in the memory P64. The processor may be implemented as a chipset of chips that include separate and multiple analog and digital processors. The processor may provide, for example, for coordination of the other components of the device P50, such as control of user interfaces, applications run by device P50, and wireless communication by device P50.

Processor P52 may communicate with a user through control interface P58 and light-emitting portion interface P56 coupled to a light-emitting portion P54. The light-emitting portion P54 may be, for example, a TFT LCD (Thin-Film-Transistor Liquid Crystal Light-emitting portion) or an OLED (Organic Light-emitting Diode) light-emitting portion, or other appropriate light-emitting portion technology. The light-emitting portion interface P56 may comprise appropriate circuitry for driving the light-emitting portion P54 to present graphical and other information to a user. The control interface P58 may receive commands from a user and convert them for submission to the processor P52. In addition, an external interface P62 may be provided in communication with processor P52, so as to enable near area communication of device P50 with other devices. External interface P62 may provide, for example, for wired communication in some implementations, or for wireless communication in other implementations, and multiple interfaces may also be used.

The memory P64 stores information within the computing device P50. The memory P64 can be implemented as one or more of a computer-readable medium or media, a volatile memory unit or units, or a non-volatile memory unit or units. Expansion memory P74 may also be provided and connected to device P50 through expansion interface P72, which may include, for example, a SIMM (Single Inline Memory Module) card interface. Such expansion memory P74 may provide extra storage space for device P50, or may also store applications or other information for device P50. Specifically, expansion memory P74 may include instructions to carry out or supplement the processes described above, and may include secure information also. Thus, for example, expansion memory P74 may be provide as a security module for device P50, and may be programmed with instructions that permit secure use of device P50. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer or machine-readable medium, such as the memory P64, expansion memory P74, or memory on processor P5 that may be received, for example, over transceiver P68 or external interface P62.

Device P50 may communicate wirelessly through communication interface P66, which may include digital signal processing circuitry where necessary. Communication interface P66 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver P68. In addition, short-range communication may occur, such as using a Bluetooth, Wi-Fi, or other such transceiver (not shown). In addition, GPS (Global Positioning System) receiver module P70 may provide additional navigation- and location-related wireless data to device P50, which may be used as appropriate by applications running on device P50.

Device P50 may also communicate audibly using audio codec P60, which may receive spoken information from a user and convert it to usable digital information. Audio codec P60 may likewise generate audible sound for a user, such as through a speaker, e.g., in a handset of device P50. Such sound may include sound from voice telephone calls, may include recorded sound (e.g., voice messages, music files, etc.) and may also include sound generated by applications operating on device P50.

The computing device P50 may be implemented in a number of different forms, as shown in the figure. For example, it may be implemented as a cellular telephone P80. It may also be implemented as part of a smart phone P82, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a light-emitting portion device (e.g., a CRT (cathode ray tube) or LCD (liquid crystal light-emitting portion) monitor) for light-emitting portioning information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The use of relative terms, such as greater, higher, increased, super, etc., used herein to describe the disclosed examples, are only intended to indicate that the disclosed examples realize display assemblies for VR head-mounted displays having higher resolutions than conventional head-mounted displays. Such terms are not to be construed as requiring or specifying that a display assembly for a VR head-mounted display constructed in accordance with this disclosure need provide a particular resolution or a particular resolution increase. As such, specific resolutions and resolution improvements need not, and will not, be specified herein. Further, terms such as, but not limited to, approximately, substantially, generally, etc. are used herein to indicate that a precise value is not required and need not be specified. As used herein, such terms will have ready and instant meaning to one of ordinary skill in the art.

Still further, use of terms such as up, down, top, bottom, side, end, front, back, etc. herein are used with reference to a currently considered or illustrated orientation. If they are considered with respect to another orientation, it should be understood that such terms must be correspondingly modified.

In this specification and the appended claims, the singular forms "a," "an" and "the" do not exclude the plural reference unless the context clearly dictates otherwise. Moreover, conjunctions such as "and," "or," and "and/or" are inclusive unless the context clearly dictates otherwise. For example, "A and/or B" includes A alone, B alone, and A with B.

Additionally, connecting lines and connectors shown in the various figures presented are intended to represent exemplary functional relationships and/or physical or logical couplings between the various elements. It should be noted that many alternative and/or additional functional relationships, physical connections or logical connections may be present. Moreover, no item or component is essential to the practice of this disclosure unless the element is specifically described as "essential" or "critical". Additionally, the figures and/or drawings are not drawn to scale, but rather are drawn for clarity of illustration and description.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method comprising:
   generating a first lower resolution image and a second lower resolution image from a higher resolution image, the first lower resolution image and the second lower resolution image each having a resolution corresponding with a resolution of a light-emitting portion of a display assembly in a head-mounted display, the higher resolution image having a higher resolution than the light-emitting portion;
   emitting light based on the first lower resolution image from a pixel of the light-emitting portion at a first location in the display assembly in the head-mounted display;
   physically translating the light-emitting portion to position the pixel at a second different location in the display assembly in the head-mounted display, the second different location being previously occupied by another pixel of the light-emitting portion; and
   emitting light based on the second lower resolution image from the pixel of the light-emitting portion at the second different location in the display assembly in the head-mounted display.

2. The method of claim 1, further comprising selectively emitting light from the pixel at the first and second locations to form the higher resolution image.

3. The method of claim 1, wherein the physically translating the light-emitting portion includes physically translating the light-emitting portion of the display assembly in at least one direction to emit light at the second location rather than at the first location.

4. The method of claim 1, further comprising controlling the display assembly to emit light from the pixel at the first location at a first angle, and to emit light from the pixel at the second location at a second angle different from the first angle.

5. The method of claim 1, further comprising controlling the display assembly to emit light from the pixel at the first location at a first angle, and to emit light from the pixel at the second location at generally the first angle.

6. A display assembly comprising:
   a light-emitting portion configured to emit light from a pixel at a first time and at a first location in the display assembly based on a first lower resolution image generated from a higher resolution image, the first lower resolution image having a resolution corresponding with a resolution of the light-emitting portion, the higher resolution image having a higher resolution than the light-emitting portion;
   a movement to physically translate the light-emitting portion of the display assembly to emit light from the pixel at a second time and at a second different location in the display assembly based on a second lower resolution image generated from the higher resolution image, the second lower resolution image having a resolution corresponding with the resolution of the light-emitting portion; and
   a second movement to physically translate the light-emitting portion of the display assembly to emit light from the pixel at a third time and at a third different location in the display assembly based on a third lower resolution image generated from the higher resolution image.

7. The display assembly of claim 6, wherein the emitting light from the pixel at the first and second locations forms the higher resolution image.

8. The display assembly of claim 6, wherein the movement is configured to physically translate the light-emitting portion of the display assembly in at least one direction to emit light at the second location rather than at the first location.

9. The display assembly of claim 6, wherein the second location is offset from the first location in a first direction, and the third location is offset from the second location in a second direction.

10. The display assembly of claim 9, wherein the second direction is perpendicular to the first direction.

11. The display assembly of claim 6, wherein the movement includes a linear actuator.

12. The display assembly of claim 6, wherein the movement includes a piezo-electric oscillator.

13. A display assembly for use in a display, the display assembly comprising:
a light-emitting portion configured to emit light at a first time from a pixel at a first location in the display based on a first lower resolution image generated from a higher resolution image, the first lower resolution image having a resolution corresponding with a resolution of the light-emitting portion, the higher resolution image having a higher resolution than the light-emitting portion; and
a layer configurable to:
direct light emitted from the pixel at a second time at a second different location in the display based on a second lower resolution image generated from the higher resolution image, the second lower resolution image having a resolution corresponding with the resolution of the light-emitting portion and the layer including a liquid crystal material having a refractive index controllable to selectively emit light at the second location rather than at the first locations and
direct light emitted from the pixel at a third time at a third different location in the display based on a third lower resolution image generated from the higher resolution image.

14. The display assembly of claim 13, wherein the emitting light from the pixel at the first and second locations forms the higher resolution image.

15. The display assembly of claim 13, wherein the light-emitting portion includes an OLED light-emitting portion.

16. The display assembly of claim 13, wherein the light-emitting portion includes an LCD light-emitting portion.

17. The display assembly of claim 13, wherein the second location is offset from the first location in a first direction, and the third location is offset from the second location in a second direction.

18. The display assembly of claim 17, wherein the second direction is perpendicular to the first direction.

* * * * *